United States Patent
Sarin et al.

(10) Patent No.: US 10,819,748 B2
(45) Date of Patent: Oct. 27, 2020

(54) SYSTEMS AND METHODS FOR ENFORCING DATA LOSS PREVENTION POLICIES ON ENDPOINT DEVICES

(71) Applicant: CA, INC., San Jose, CA (US)

(72) Inventors: Sumit Sarin, Pune (IN); Dhananjay Dodke, Pune (IN); Bishnu Chaturvedi, Pune (IN); Kedar Apte, Pune (IN)

(73) Assignee: CA, Inc., San Jose, CA (US)

( * ) Notice: Subject to any disclaimer, the term of this patent is extended or adjusted under 35 U.S.C. 154(b) by 219 days.

(21) Appl. No.: 15/862,589

(22) Filed: Jan. 4, 2018

(65) Prior Publication Data
US 2019/0207980 A1 Jul. 4, 2019

(51) Int. Cl.
*G06F 21/74* (2013.01)
*H04L 29/06* (2006.01)
(Continued)

(52) U.S. Cl.
CPC .............. *H04L 63/20* (2013.01); *G06F 21/44* (2013.01); *G06F 21/6218* (2013.01); *G06F 21/74* (2013.01); *G06F 21/85* (2013.01); *H04L 63/1408* (2013.01); *H04L 63/1441* (2013.01); *G06F 2221/2101* (2013.01); *G06F 2221/2113* (2013.01)

(58) Field of Classification Search
CPC . H04L 63/1425; H04L 63/1433; H04L 63/20; H04M 1/72577; H04W 12/0027; H04W 12/00505; H04W 12/08; H04W 88/02
See application file for complete search history.

(56) References Cited

U.S. PATENT DOCUMENTS 8,782,084 B2 7/2014 Cambridge et al.
9,071,580 B2 * 6/2015 Pigeon ................ H04L 63/0435
(Continued)

OTHER PUBLICATIONS

Margaret Rouse; Geo-fencing (http://whatis.techtarget.com/definition/geofencing;); Dec. 2016.
(Continued)

*Primary Examiner* — Olugbenga O Idowu
(74) *Attorney, Agent, or Firm* — FisherBroyles, LLP

(57) ABSTRACT

The disclosed computer-implemented method for enforcing data loss prevention policies on endpoint devices may include (i) detecting that an endpoint device has terminated a connection with a protected network that is protected by a network-level data loss prevention system and has connected to an external network that is not protected, (ii) switching, in response to detecting that the endpoint device has connected to the external network, from an in-network data loss prevention policy to an out-of-network data loss prevention policy, (iii) detecting an inbound data transfer to the endpoint device, (iv) determining that the inbound data transfer comprises a transfer from a protected source that is protected by the out-of-network data loss prevention policy, and (v) performing a security action in response to determining that the inbound data transfer to the endpoint device comprises the transfer from the protected source. Various other methods, systems, and computer-readable media are also disclosed.

20 Claims, 7 Drawing Sheets

(51) Int. Cl.
*G06F 21/62* (2013.01)
*G06F 21/44* (2013.01)
*G06F 21/85* (2013.01)

(56) References Cited

U.S. PATENT DOCUMENTS

| | | |
|---|---|---|
| 9,246,944 B1 | 1/2016 | Chen |
| 2014/0026198 A1* | 1/2014 | Isozaki .................. H04L 63/10 726/4 |

OTHER PUBLICATIONS

Roman Foeckl; 3 location-based technologies reinventing data security (https://thenextweb.com/insider/2016/03/29/beacons-indoor-mapping-geofencing-helping-reinvent-data-security/#.tnw_Egzbylyz); Mar. 29, 2016.

Druva; Configure Geofencing policy for your organization (https://docs.druva.com/001_inSync_Cloud/Cloud/030_Governance_DLP/020_Data_Loss_Prevention/Data_Loss_Prevention/Configure_Geofencing_policy_for_your_organization); May 31, 2017.

Merrimack et al.; Systems and Methods for Automatically Adjusting User Access Permissions Based on Beacon Proximity; U.S. Appl. No. 15/063,778, filed Mar. 8, 2016.

International Search Report and Written Opinion received for PCT Application Serial No. PCT/US2018/066614 dated Mar. 22, 2019, 12 pages.

Bishop et al., "Windows Server 2008—Windows Firewall with Advanced Security Step-by-Step Guide—Deploying Firewall Policies", Microsoft, Oct. 2007, pp. 1-68.

\* cited by examiner

SYSTEMS AND METHODS FOR ENFORCING DATA LOSS PREVENTION POLICIES ON ENDPOINT DEVICES

BACKGROUND

Internal networks are often filled with sensitive data in the form of confidential information, information protected by regulations, personally identifying information, financial information, and more. Data breaches, events where this sensitive data is leaked to external actors, are not only embarrassing for organizations but potentially financially devastating. Ensuring that this data is kept secure is important for both an organization's reputation and for its success. Many organizations have data loss prevention (DLP) policies to ensure that sensitive data is handled correctly by users and devices that have access to such information. In many cases, DLP policies may be enforced not only on servers connected to the intranet but also on endpoint devices such as mobile devices. However, enforcing DLP policies on mobile devices can be difficult due to the tendency of mobile devices to connect to both secure and non-secure networks.

Unfortunately, traditional systems for enforcing DLP policies on endpoint devices may suffer from a number of flaws. In some cases, a separate DLP system on an endpoint device may create duplicate reports or perform duplicate actions to a network-level DLP system. In other cases, where the endpoint device is not configured with a separate DLP system, the extraction of sensitive data from a protected resource when the device is off the network may pass unnoticed. The instant disclosure, therefore, identifies and addresses a need for systems and methods for enforcing data loss prevention policies on endpoint devices.

SUMMARY

As will be described in greater detail below, the instant disclosure describes various systems and methods for enforcing data loss prevention policies on endpoint devices.

In one example, a computer-implemented method for enforcing DLP policies on endpoint devices may include (i) detecting that an endpoint device has terminated a connection with a protected network that is protected by a network-level DLP system that protects sensitive data on the protected network and has connected to an external network that is not protected by the network-level DLP system, (ii) switching, in response to detecting that the endpoint device has connected to the external network, from an in-network DLP policy that applied to the connection between the endpoint device and the protected network to an out-of-network DLP policy that applies to the connection between the endpoint device and the external network, where the out-of-network DLP policy protects the sensitive data by monitoring both inbound and outbound data transfers on the endpoint device, (iii) detecting an inbound data transfer to the endpoint device, (iv) determining that the inbound data transfer to the endpoint device includes a transfer from a protected source that is protected by the out-of-network DLP policy, and (v) performing a security action in response to determining that the inbound data transfer to the endpoint device includes the transfer from the protected source.

In one example, the security action may include blocking the inbound data transfer. In another example, the security action may include encrypting data transferred by the inbound data transfer. Additionally or alternatively, the security action may include creating an audit record documenting the inbound data transfer.

In some examples, determining that the inbound data transfer to the endpoint device includes the transfer from the protected source that is protected by the out-of-network DLP policy may include determining that the protected source is within the protected network. In one embodiment, the computer-implemented method may further include (i) detecting an outbound data transfer from the endpoint device, (ii) determining that the outbound data transfer from the endpoint device includes a transfer of protected data that is protected by the out-of-network DLP policy, and (iii) performing a security action in response to determining that the outbound data transfer from the endpoint device includes the transfer of the protected data.

In one embodiment, the computer-implemented method may further include detecting that the endpoint device has terminated a connection with the external network that is not protected by the network-level DLP system and has initiated a connection with the protected network that is protected by the network-level DLP system and switching, in response to detecting that the endpoint device has connected to the protected network, from the out-of-network DLP policy the in-network DLP policy, where the out-of-network DLP policy includes at least one policy rule not present in the in-network DLP policy. In some examples, switching to the in-network DLP policy may include ceasing monitoring, by a DLP system on the endpoint device, inbound data transfers to the endpoint device.

In some examples, detecting the inbound data transfer to the endpoint device may include monitoring a file system process via a plugin that extends the functionality of the file system process by providing information about data received by the file system process. In one embodiment, detecting the inbound data transfer to the endpoint device may include identifying the inbound data transfer by a file system driver and determining that the inbound data transfer to the endpoint device includes the transfer from the protected source may include identifying, by a network driver, an address of the protected source. Additionally or alternatively, detecting the inbound data transfer to the endpoint device may include detecting the inbound data transfer via an application programming interface hook to a web browser and determining that the inbound data transfer to the endpoint device includes the transfer from the protected source may include identifying, by a browser extension, at least one of a uniform resource locator and a server of the protected source.

In some examples, detecting that the endpoint device has terminated the connection with the protected network and has connected to the external network may include detecting that the endpoint device has terminated a virtual private network connection. Additionally or alternatively, detecting that the endpoint device has terminated the connection with the protected network and has connected to the external network may include detecting that the endpoint device is no longer connected to a predetermined server.

In one embodiment, a system for implementing the above-described method may include (i) a network detection module, stored in memory, that detects that an endpoint device has terminated a connection with a protected network that is protected by a network-level DLP system that protects sensitive data on the protected network and has connected to an external network that is not protected by the network-level DLP system, (ii) a switching module, stored in memory, that switches, in response to detecting that the endpoint device has connected to the external network, from an in-network DLP policy that applied to the connection between the endpoint device and the protected network to an out-of-network DLP policy that applies to the connection between the endpoint device and the external network, where the out-of-network DLP policy protects the sensitive data by monitoring both inbound and outbound data transfers on the endpoint device, (iii) a transfer detection module, stored in memory, that detects an inbound data transfer to the endpoint device, (iv) a determination module, stored in memory, that determines that the inbound data transfer to the endpoint device includes a transfer from a protected source that is protected by the out-of-network DLP policy, (v) a security module, stored in memory, that performs a security action in response to determining that the inbound data transfer to the endpoint device includes the transfer from the protected source, and (vi) at least one physical processor that executes the network detection module, the switching module, the transfer detection module, the determination module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect that an endpoint device has terminated a connection with a protected network that is protected by a network-level DLP system that protects sensitive data on the protected network and has connected to an external network that is not protected by the network-level DLP system, (ii) switch, in response to detecting that the endpoint device has connected to the external network, from an in-network DLP policy that applied to the connection between the endpoint device and the protected network to an out-of-network DLP policy that applies to the connection between the endpoint device and the external network, where the out-of-network DLP policy protects the sensitive data by monitoring both inbound and outbound data transfers on the endpoint device, (iii) detect an inbound data transfer to the endpoint device, (iv) determine that the inbound data transfer to the endpoint device includes a transfer from a protected source that is protected by the out-of-network DLP policy, and (v) perform a security action in response to determining that the inbound data transfer to the endpoint device includes the transfer from the protected source.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
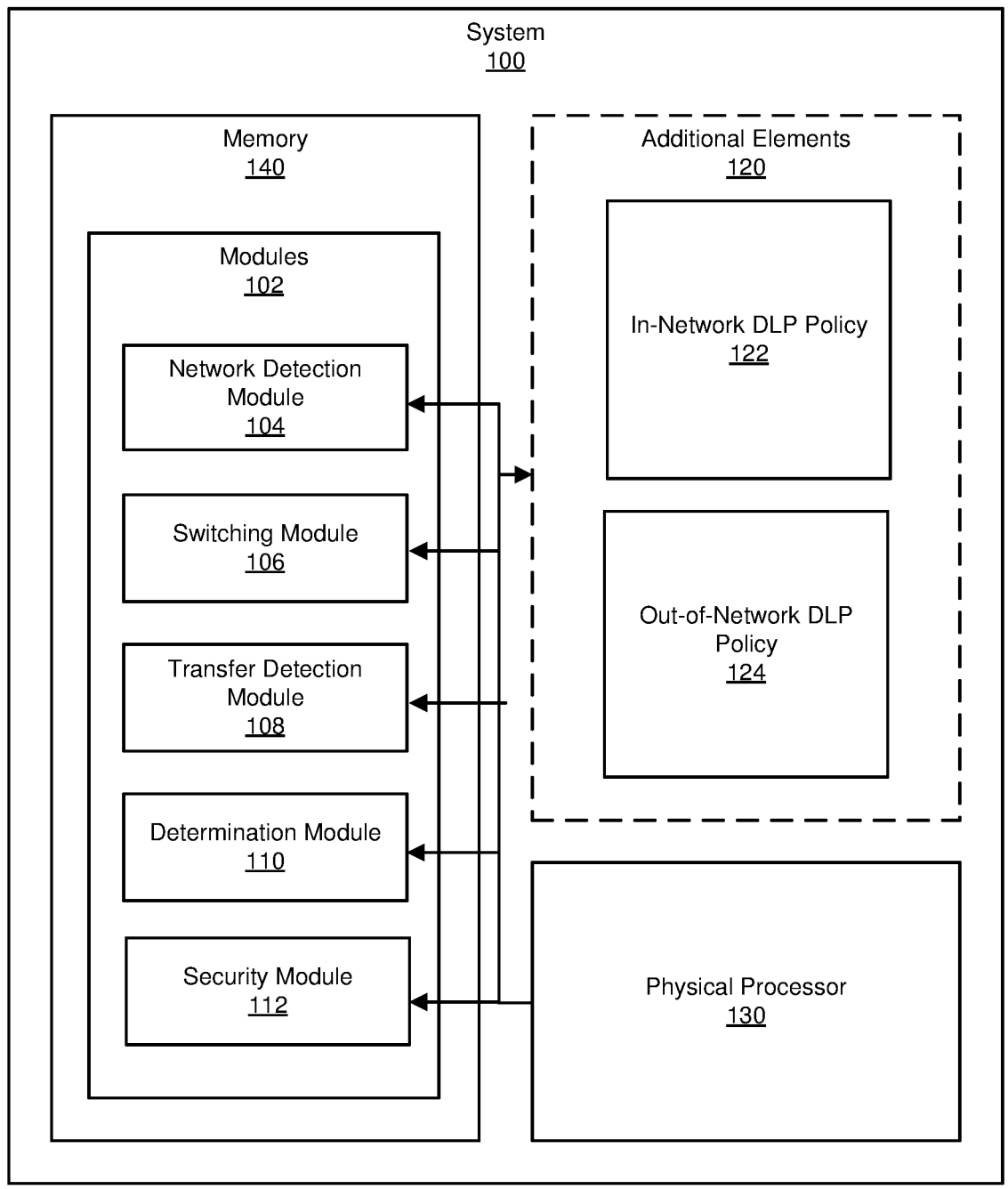
FIG. 1 is a block diagram of an example system for enforcing data loss prevention policies on endpoint devices.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enforcing data loss prevention policies on endpoint devices. As will be explained in greater detail below, by switching between in-network and out-of-network policies based on whether the device is on a protected network, the systems and methods described herein may enforce DLP policies on an endpoint device without performing redundant actions that are also performed by a network-level DLP enforcement system. By monitoring both inbound and outbound transfers when the device is off-network, the systems and methods described herein may prevent and/or log transfers of sensitive data from protected sources, reducing the risk that sensitive data will be leaked by a device that is not connected to a protected network. In addition, the systems and methods described herein may improve the functioning of a computing device by increasing the efficiency and accuracy of DLP enforcement systems that act on the computing device. These systems and methods may also improve the field of DLP by more effectively protecting sensitive data under a variety of circumstances.

Figure 2:
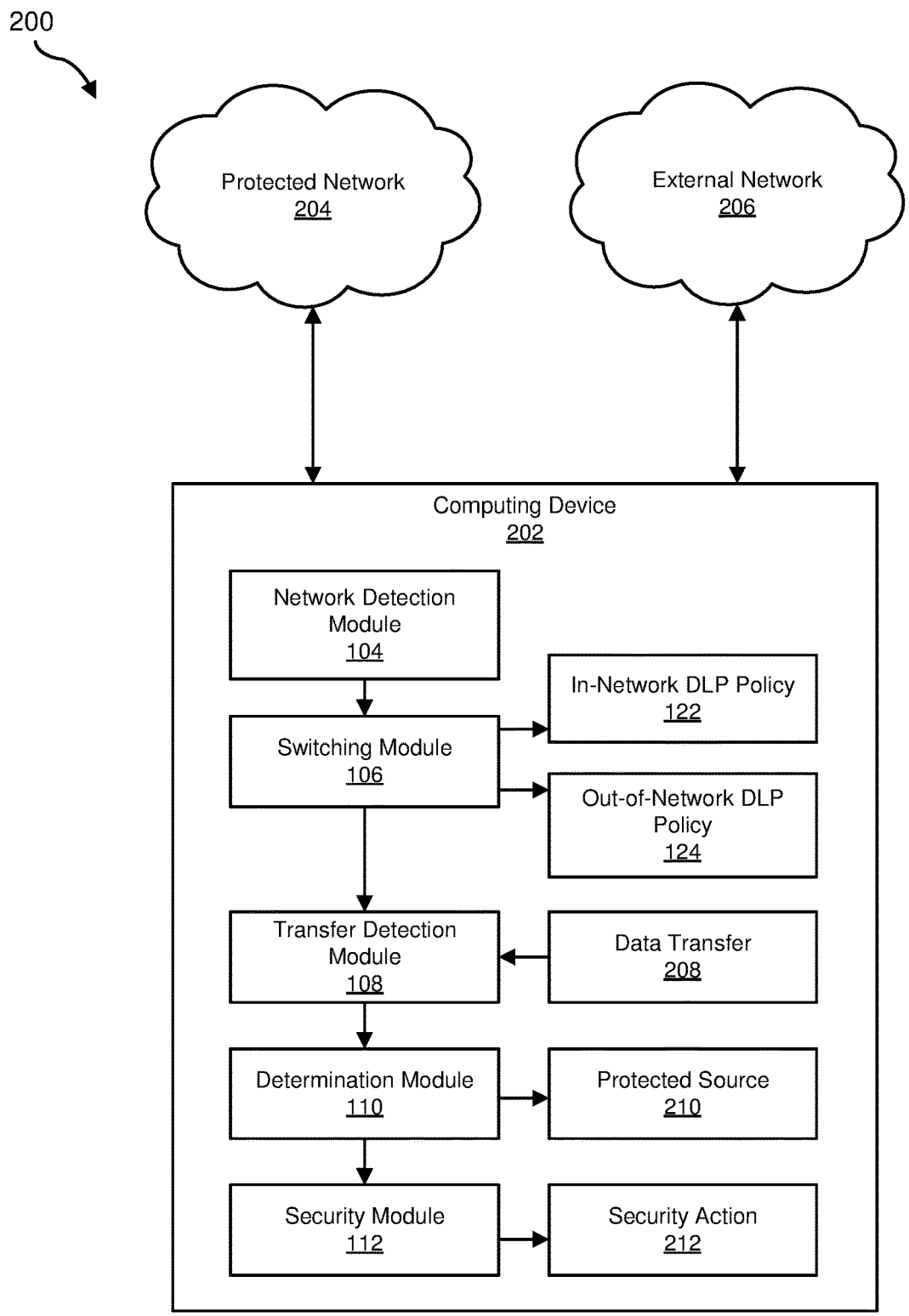
FIG. 2 is a block diagram of an additional example system for enforcing data loss prevention policies on endpoint devices.
Figure 4:
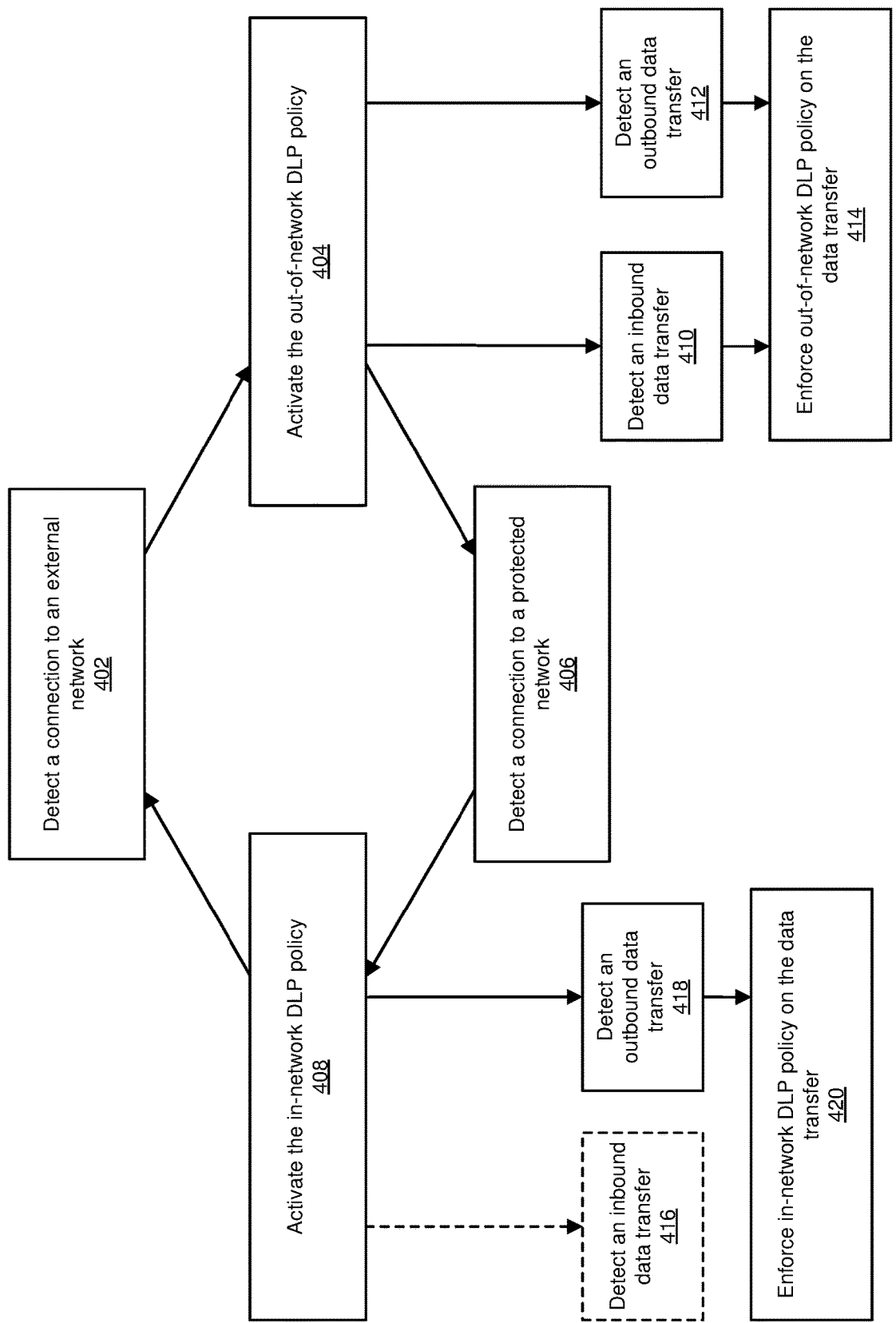
FIG. 4 is a flow diagram of an example method for enforcing data loss prevention policies on endpoint devices.
Figure 5:
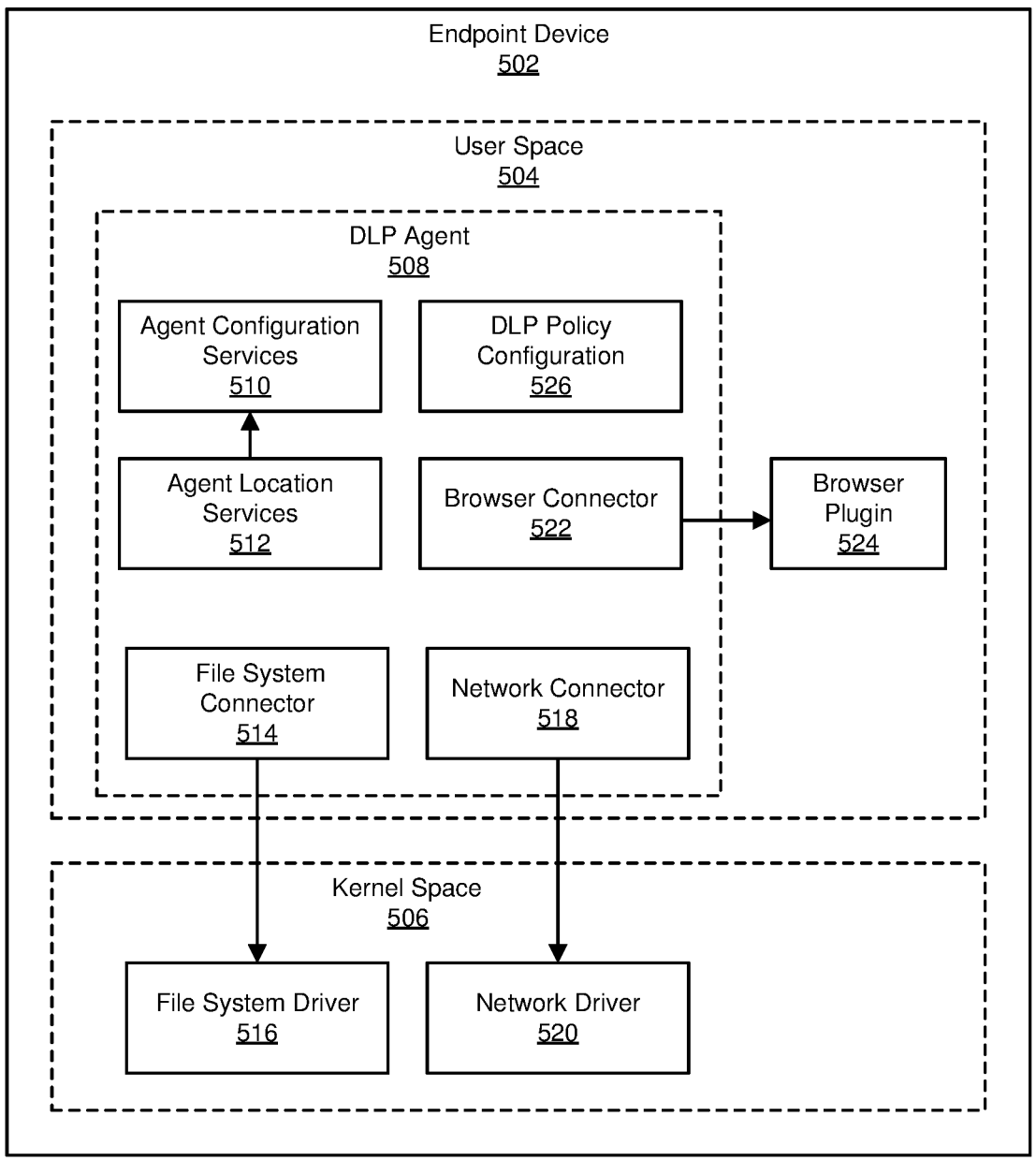
FIG. 5 is a block diagram of an example computing system for enforcing data loss prevention policies on endpoint devices.

The following will provide, with reference to FIGS. 1, 2, and 5, detailed descriptions of example systems for enforcing data loss prevention policies on endpoint devices. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 6 and 7, respectively.

FIG. 1 is a block diagram of example system 100 for enforcing DLP policies on endpoint devices. As illustrated in this figure, example system 100 may include one or more modules 102 for performing one or more tasks. For example, and as will be explained in greater detail below, example system 100 may include a network detection module 104 that detects that an endpoint device has terminated a connection with a protected network that is protected by a network-level DLP system that protects sensitive data on the protected network and has connected to an external network that is not protected by the network-level DLP system.

Example system 100 may additionally include a switching module 106 that switches, in response to detecting that the endpoint device has connected to the external network, from an in-network DLP policy that applied to the connection between the endpoint device and the protected network to an out-of-network DLP policy that applies to the connection between the endpoint device and the external network, where the out-of-network DLP policy protects the sensitive data by monitoring both inbound and outbound data transfers on the endpoint device. Example system 100 may also include a transfer detection module 108 that detects an inbound data transfer to the endpoint device. Example system 100 may additionally include a determination module 110 that determines that the inbound data transfer to the endpoint device includes a transfer from a protected source that is protected by the out-of-network DLP policy. Example system 100 may also include a security module 112 that performs a security action in response to determining that the inbound data transfer to the endpoint device includes the transfer from the protected source. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enforcing data loss prevention policies on endpoint devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as in-network DLP policy 122 and/or out-of-network DLP policy 124. In-network DLP policy 122 and/or out-of-network DLP policy 124 generally represent any type or form of rulesets that describe a DLP policy for an endpoint device.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a protected network 204 and/or an external network 206. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to enforce DLP policies on endpoint devices. For example, and as will be described in greater detail below, network detection module 104 may detect that computing device 202 has terminated a connection with a protected network 204 that is protected by a network-level DLP system that protects sensitive data on protected network 204 and has connected to external network 206 that is not protected by the network-level DLP system. Switching module 106 may switch, in response to detecting that computing device 202 has connected to external network 206, from an in-network DLP policy 122 that applied to the connection between computing device 202 and protected network 204 to an out-of-network DLP policy 124 that applies to the connection between computing device 202 and external network 206, where out-of-network DLP policy 124 protects the sensitive data by monitoring both inbound and outbound data transfers on computing device 202. At some later time, transfer detection module 108 may detect an inbound data transfer 208 to computing device 202. Next, determination module 110 may determine that inbound data transfer 208 to computing device 202 includes a transfer from a protected source 210 that is protected by out-of-network DLP policy 124. Security module 112 may perform a security action 212 in response to determining that inbound data transfer 208 to computing device 202 includes the transfer from protected source 210.

Computing device 202 generally represents any type or form of computing device capable of reading computer-executable instructions. In some embodiments, computing device 202 may be a portable endpoint device such as a laptop, mobile phone, and/or tablet. Additional examples of computing device 202 include, without limitation, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Protected network 204 and/or external network 206 generally represent any medium or architecture capable of facilitating communication or data transfer. In one example, protected network 204 may facilitate communication between computing device 202 and one or more secure servers and/or devices. In some examples, external network 206 may facilitate communication between computing device 202 and one or more insecure servers and/or devices. Protected network 204 and/or external network 206 may facilitate communication or data transfer using wireless and/or wired connections. Examples of protected network 204 and/or external network 206 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Data transfer 208 generally represents any type or form of transmission of data from an external source to computing device 202. Protected source 210 generally represents any type or form of physical or virtual computing device that contains data that is protected by a DLP policy. Security action 212 generally represents any type of action taken by a DLP enforcement system.

Figure 3:
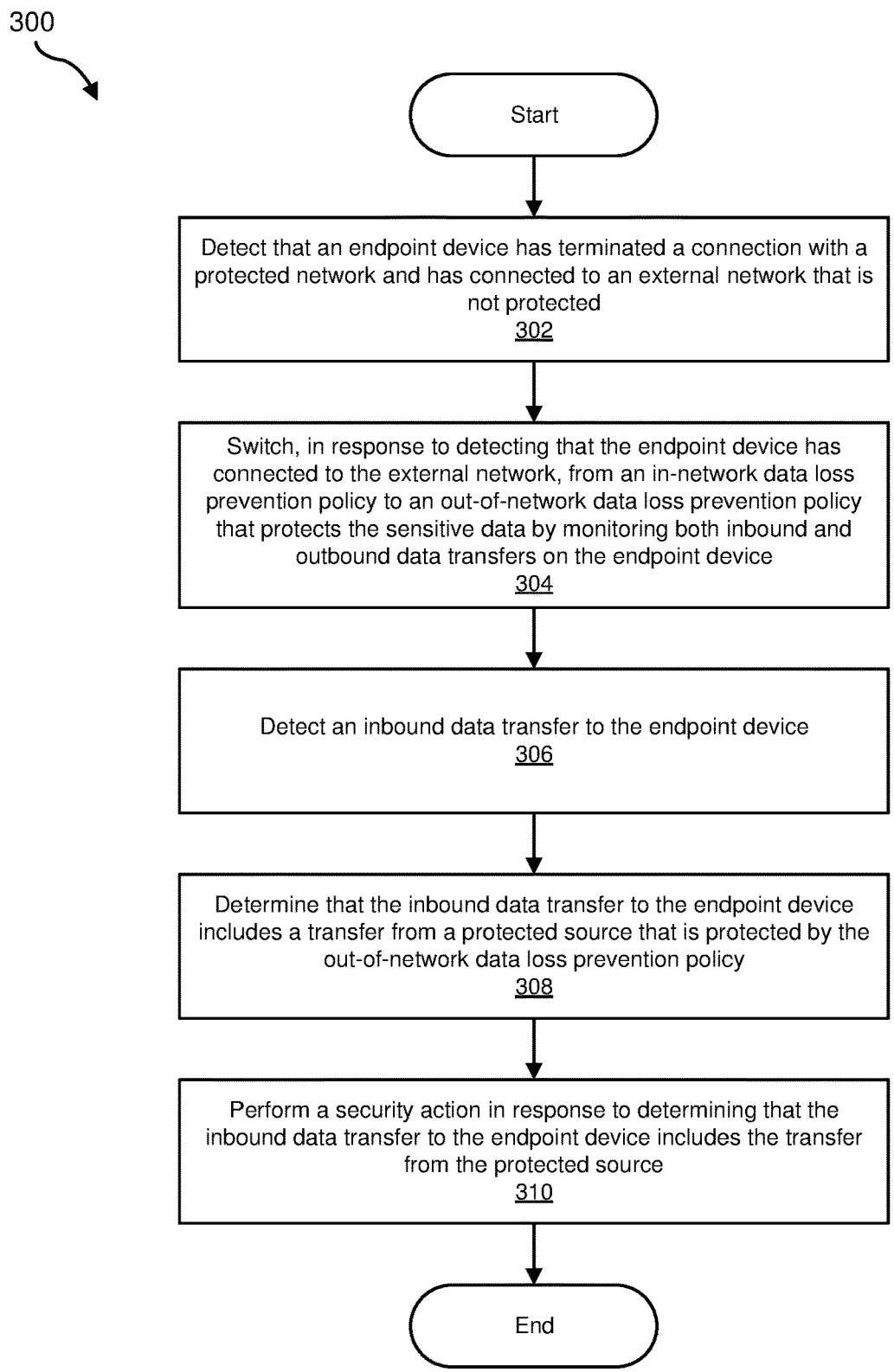
FIG. 3 is a flow diagram of an example method for enforcing data loss prevention policies on endpoint devices.

FIG. 3 is a flow diagram of an example computer-implemented method 300 for enforcing data loss prevention policies on endpoint devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect that an endpoint device has terminated a connection with a protected network that is protected by a network-level DLP system that protects sensitive data on the protected network and has connected to an external network that is not protected by the network-level DLP system. For example, network detection module 104 may, as part of computing device 202 in FIG. 2, detect that computing device 202 has terminated a connection with protected network 204 that is protected by a network-level DLP system that protects sensitive data on protected network 204 and has connected to external network 206 that is not protected by the network-level DLP system.

The term "endpoint device," as used herein, generally refers to any computing device capable of network connectivity. In some examples, an endpoint device may be a personal device operated by a user, such as a laptop or smartphone. In some embodiments, an endpoint device may be a mobile device that is easily moved between different physical locations, as opposed to a more stationary device such as a desktop computer. In some examples, a user may frequently move an endpoint device between different locations that enable connectivity to different networks. Additionally or alternatively, a user may use an endpoint device as both a personal computing device and a work computing device and may thus connect the endpoint device at times to protected networks for work purposes and at other times to external networks for leisure purposes. In other examples, a user may connect to an external network in order to work remotely. In some examples, an endpoint device may be owned by the organization but may be used by a user to work both locally via protected networks and offsite via external networks.

The term "network-level DLP system," as used herein, generally refers to any DLP system that enforces a DLP policy on multiple devices on a network and/or traffic between devices on a network. In some embodiments, a network-level DLP system may monitor, inspect, and/or control all traffic between computing systems on a particular network. In one embodiment, a network-level DLP system may enforce a DLP policy on any device connected to a network. In some embodiments, a network-level DLP system may be installed on a computing device that relays network traffic, such as a proxy server, router, bridge, and/or switch.

The term "protected network," as used herein, generally refers to any network that connects devices that store sensitive information protected by a DLP policy and that is itself protected by a network-level DLP system. In some examples, a protected network may be an internal corporate network. In one example, a protected network may be and/or be accessible via a virtual private network. For example, a user may connect to the Internet via a public wireless network and then, via the Internet, may connect to a virtual private network that contains protected data and/or is protected by a network-level DLP system. In another example, a user may connect to their home local area network and may from there connect to a virtual private network that is a protected network. In this way, a user may access a protected internal network for an organization despite not being located on the organization's premises and/or not being directly connected to a protected local area network.

The term "external network," as used herein, generally refers to any network that is not protected by a network-level DLP system. In some examples, an external network may be a public network. Additionally or alternatively, an external network may be a user's home network and/or a corporate network that is not protected by a network-level DLP system.

Network detection module 104 may detect that the endpoint device has switched networks in a variety of ways. In some examples, network detection module 104 may determine that the endpoint device has switched networks by determining that the Internet protocol address for the endpoint device has changed. In some embodiments, network detection module 104 may monitor a network driver, networking application, network adapter, one or more ports, and/or any other component of the endpoint device to detect when the endpoint device has switched networks. Additionally or alternatively, network detection module 104 may determine that the endpoint device has connected to the external network by identifying the wireless hotspot to which the endpoint device is connected.

In some examples, network detection module 104 may detect that the endpoint device has terminated the connection with the protected network and has connected to the external network by detecting that the endpoint device has terminated a virtual private network connection. For example, a protected network may include and/or be accessible via a virtual private network, and network detection module 104 may monitor connections to the virtual private network to determine whether the computing device is currently connected to the protected network. In some examples, network detection module 104 may determine that an endpoint device that has connected to a protected virtual private network via an external local area network is connected to a protected network. In some examples, network detection module 104 may determine that the endpoint device has terminated the connection with the protected network and connected to the external network when the endpoint device disconnects from the virtual private network, even though the endpoint device did not initiate a new connection to the external network after disconnecting from the virtual private network because the endpoint device was already connected to the external network.

In some examples, network detection module 104 may detect that the endpoint device has terminated the connection with the protected network and has connected to the external network by detecting that the endpoint device is no longer connected to a predetermined server. In some embodiments, network detection module 104 may maintain a list of one or more servers accessible via the protected network. In these embodiments, if the computing device is no longer connected to any of the servers on the private network then network detection module 104 may determine that the computing device is no longer connected to the protected network. Similarly, if the computing device was not connected to any of the servers and now is, detection module 104 may determine that the computing device has initiated a connection to the protected network. In some embodiments, network detection module 104 may detect whether a DLP agent on the endpoint device is connected to a management server for the DLP agent that is on the protected network.

At step 304, one or more of the systems described herein may switch, in response to detecting that the endpoint device has connected to the external network, from an in-network DLP policy that applied to the connection between the endpoint device and the protected network to an out-of-network DLP policy that applies to the connection between the endpoint device and the external network, where the out-of-network DLP policy protects the sensitive data by monitoring both inbound and outbound data transfers on the endpoint device. For example, switching module 106 may, as part of computing device 202 in FIG. 2, switch, in response to detecting that computing device 202 has connected to external network 206, from in-network DLP policy 122 that applied to the connection between computing device 202 and protected network 204 to out-of-network DLP policy 124 that applies to the connection between computing device 202 and external network 206, where out-of-network DLP policy 124 protects the sensitive data by monitoring both inbound and outbound data transfers on computing device 202.

The term "DLP policy," as used herein, generally refers to any set of one or more DLP rules and/or parameters that describe and/or enforce permissible behavior relating to sensitive data. In some embodiments, a DLP policy may describe categories of sensitive data and/or actions that can be taken on each category of sensitive data on a computing device. In one embodiment, a DLP policy may be enforced by an application, script, library, driver, and/or other software that enforces DLP rules on a computing device. In some examples, one DLP system may enforce multiple DLP policies at different times and/or in different situations.

The term "out-of-network DLP policy," as used herein, generally refers to any DLP policy that is enforced on a computing device that is not currently connected to a network that is protected by a network-level DLP system. In some embodiments, an out-of-network DLP policy may monitor outbound data transfers to network shares, data transfers involving corporate servers, network hypertext transfer protocol (HTTP) connections, network HTTP secure (HTTPS) connections, network file transfer protocol (FTP) connections, and/or email. In some examples, an out-of-network DLP policy may include at least one policy rule not present in an in-network DLP policy, such as a rule about monitoring and/or blocking inbound data transfers from protected sources. For example, an out-of-network DLP policy may monitor inbound data transfers from corporate data sources, browser downloads, and/or file copy actions from the network, applications, and/or terminal servers.

The term "in-network DLP policy," as used herein, generally refers to any DLP policy that is enforced on a computing device that is connected to a network that is protected by a network-level DLP system. In some examples, an in-network DLP policy may have fewer and/or less stringent rules than an out-of-network DLP policy. For example, an in-network DLP policy may not include rules for monitoring incoming data. In some examples, an in-network DLP policy may not include rules that are redundant to rules enforced by a network-level DLP system. For example, if a network-level DLP system creates an incident report whenever a sensitive file is emailed, there may be no need for a DLP policy on an endpoint device to create a duplicate incident report about the same event. In some embodiments, an in-network DLP policy may ignore network shares, data transfers involving corporate servers, network HTTP connections, network HTTPS connections, network FTP connections, and/or email. In some examples, the in-network DLP policy may ignore certain types of data transfer because a network-level DLP system may already monitor these types of data transfers.

The term "inbound data transfer," as used herein, generally refers to any transmission of data to an endpoint computing device. In some embodiments, an inbound data transfer may be a transmission of data over a network. In one example, an inbound data transfer may be an inbound file transfer and/or file download. Additionally or alternatively, loading a web page may be an inbound data transfer.

The term "outbound data transfer," as used herein, generally refers to any transmission of data from an endpoint computing device. In some embodiments, an outbound data transfer may be a transmission of data over a network. Examples of outbound data transfers may include, without limitation, uploading files, transferring files, and/or sending electronic messages.

Switching module 106 may switch from the in-network DLP policy to the out-of-network DLP policy in a variety of ways. For example, switching module 106 may activate a set of rules that apply to the out-of-network DLP policy but not the in-network DLP policy and/or may deactivate a set of rules that apply to the in-network DLP policy but not the out-of-network DLP policy. In some examples, switching module 106 may switch between two completely different rulesets. In other examples, some rules may be consistent between DLP policies. For example, switching module 106 may reconfigure the out-of-network DLP policy to produce the in-network DLP policy. Additionally or alternatively, switching module 106 may add one or more DLP rules and/or specifications to the out-of-network DLP policy to produce the in-network DLP policy. In some embodiments, switching module 106 may activate and/or deactivate certain types of monitoring based on the active policy.

At step 306, one or more of the systems described herein may detect an inbound data transfer to the endpoint device. For example, transfer detection module 108 may, as part of computing device 202 in FIG. 2, detect inbound data transfer 208 to computing device 202.

Transfer detection module 108 may detect the inbound data transfer in a variety of ways. In some examples, transfer detection module 108 may detect the inbound data transfer to the endpoint device by monitoring a file system process via a plugin that extends the functionality of the file system process by providing information about data received by the file system process. For example, transfer detection module 108 may monitor WINDOWS EXPLORER via a shell callback in EXPLORER.

In one embodiment, transfer detection module 108 may detect the inbound data transfer to the endpoint device via a file system driver. For example, transfer detection module 108 may monitor the file system driver in order to detect file transfer actions. Additionally or alternatively, transfer detection module 108 may detect the inbound data transfer to the endpoint device via an application programming interface (API) hook to a web browser. In some examples, transfer detection module 108 may use an API hook in a web browser to detect that the web browser is downloading a file by hooking the save file dialog function for the web browser.

At step 308, one or more of the systems described herein may determine that the inbound data transfer to the endpoint device may include a transfer from a protected source that is protected by the out-of-network DLP policy. For example, determination module 110 may, as part of computing device 202 in FIG. 2, determine that inbound data transfer 208 to computing device 202 may include a transfer from protected source 210 that is protected by out-of-network DLP policy 124.

The term "protected source," as used herein, generally refers to any physical and/or virtual location where data is stored that is protected by a DLP system and/or DLP policy. In some embodiments, a protected source may be a server. Additionally or alternatively, a protected source may be a website, a web server, a network share, and/or a specified subset of files and/or folders stored on any of the above.

Determination module 110 may determine that the inbound data transfer is from the protected source in a variety of ways and/or contexts. In some embodiments, determination module 110 may determine that the inbound data transfer is from the protected source in different ways depending on the type of inbound data transfer and/or how transfer detection module 108 detected the transfer. In some embodiments, after determining that the inbound data transfer is from a protected source, determination module 110 may scan the contents of the data transfer to determine what DLP policy rules apply to the data.

In one example, transfer detection module 108 may detect the inbound data transfer via a file system driver and determination module 110 may determine that the transfer is from a protected source by identifying, by a network driver, an address of the protected source. For example, transfer detection module 108 may detect, via the file system driver, that a file is being downloaded from an external source and determination module 110 may use the network driver to determine the origin of the file. In some examples, determination module 110 may determine the media access control address of the source of the data. In other examples, determination module 110 may determine the Internet protocol address of the source of the data. In some embodiments, determination module 110 may store and/or reference a list of addresses of protected sources and may determine that the source is a protected source by comparing the address of the source to the list of addresses. In some embodiments, determination module 110 may use the network driver to determine the source of the data transfer by monitoring a predetermined application or set of applications such as CITRIX, VMWARE, and/or a MICROSOFT terminal client.

In another example, transfer detection module 108 may detect the inbound data transfer to the endpoint device via an API hook to a web browser and determination module 110 may determine that the inbound data transfer is from the protected source by identifying, by a browser extension, a uniform resource locator (URL) and/or a server of the protected source. In some examples, the API hook may not have access to sufficient information to determine which browser tab initiated the file download. In these examples, the browser extension may provide additional information to enable determination module 110 to correlate the website that is the source of the transfer of the transfer with the transfer action.

Additionally or alternatively, determination module 110 may determine that the inbound data transfer to the endpoint device is from the protected source by determining that the protected source is within the protected network. For example, determination module 110 may determine that an identifier of the protected source is an identifier of a location and/or resource on the protected network.

At step 310, one or more of the systems described herein may perform a security action in response to determining that the inbound data transfer to the endpoint device includes the transfer from the protected source. For example, security module 112 may, as part of computing device 202 in FIG. 2, perform security action 212 in response to determining that inbound data transfer 208 to computing device 202 includes the transfer from protected source 210.

Security module 112 may perform a variety of security actions. In one embodiment, the security action may include blocking the inbound data transfer. In some examples, the systems described herein may detect the inbound data transfer before the data is on the endpoint device and may block the data transfer by preventing the data transfer from taking place. In other examples, the systems described herein may detect the inbound data transfer after the data is on the endpoint device and may block the inbound data transfer by securely deleting the data from the device. In some embodiments, the systems described herein may identify and delete the protected data quickly enough to perform what is effectively real-time blocking of the data transfer.

In one embodiment, the security action may include encrypting data transferred by the inbound data transfer. In some examples, security module 112 may encrypt the data transfer while the data transfer is in progress. Additionally or alternatively, security module 112 may encrypt the data on the endpoint device. In some examples, a DLP policy may specify an encryption level for certain types of data and/or data in certain contexts. For example, security module 112 may encrypt the data in response to determination module 110 determining that the data is from a source that houses data that, according to the DLP policy, must be stored in encrypted form when on mobile devices.

In one embodiment, the security action may include creating an audit record documenting the inbound data transfer. In one example, the DLP policy may specify that some actions, such as downloading protected data onto a mobile device that is currently connected to an external network, are permitted but must be documented. In another example, security module 112 may both delete the data and create a record of the data transfer. Additionally or alternatively, security module 112 may notify an administrator of the potential DLP policy violation.

In some embodiments, security module 112 may enforce the DLP policy that applies to a protected network to any data downloaded from the protected network. For example, the systems described herein may detect an incoming data transfer, determine that the incoming data transfer originates from the protected network, and then apply any DLP policy that applies to the treatment of the data on the protected network to the treatment of the data on the endpoint device. For example, security module 112 may prevent the transmission of protected data from the endpoint device to devices not on the protected network. In another example, security module 112 may prevent applications that are not marked as secure from accessing protected data.

In some embodiments, the systems described herein may monitor and/or perform actions on both inbound and outbound data transfers while the endpoint device is connected to an external network and/or may monitor outbound data transfers when the endpoint device is connected to a protected network using any of the techniques previously described for identifying, detecting, and/or making determinations about outbound data transfers while on an external network. For example, as illustrated in FIG. 4, at step 402, the systems described herein may detect a connection to an external network. In response, at step 404, the systems described herein may activate the out-of-network DLP policy. In some examples, at step 410, the systems described herein may detect an inbound data transfer. Additionally or alternatively, at step 412, the systems described herein may detect an outbound data transfer. Either way, at step 414, the systems described herein may enforce the out-of-network DLP policy on the data transfer. In some examples, the systems described herein may determine that the outbound data transfer includes a transfer of protected data that is protected by the out-of-network DLP policy and/or may perform a security action on the outbound data transfer.

At some later point in time, at step 406, the systems described herein may detect a connection to a protected network. In response, at step 408 the systems described herein may activate the in-network DLP policy. In some embodiments, at step 416, the systems described herein may detect an inbound data transfer. In other embodiments, the systems described herein that are installed on the endpoint device may not monitor inbound data transfers for DLP purposes when the endpoint device is connected to a protected network. In some examples, at step 418, the systems described herein may detect an outbound data transfer. At step 420, the systems described herein may enforce the in-network DLP policy on the data transfer. At some later time, the systems described herein may again detect a connection to an external network, returning to step 402.

In some embodiments, the systems described herein may enforce DLP rules on endpoint devices using a variety of components and/or modules on the endpoint device. For example, as illustrated in FIG. 5, an endpoint device 502 may be configured with a DLP agent 508 in user space 504 that communicates with components in kernel space 506. In some embodiments, DLP agent 508 may locally store a DLP policy configuration 526 that includes an in-network DLP policy and/or an out-of-network DLP policy. In some examples, agent configuration services 510 in communication with agent location services 512 may determine whether endpoint device 502 is connected to a protected network or an external network and/or determine the proper DLP configuration for the device's current location.

In one example, a file system connector 514 in user space 504 may monitor and/or communicate with a file system driver 516 in kernel space 506 in order to detect file transfers. In some embodiments, a network connector 518 in user space 504 may monitor and/or communicate with a network driver 520 in kernel space 506 in order to identify the source of data transfers. In some examples, a browser connector 522 that is part of DLP agent 508 may monitor and/or communicate with a browser plugin 524 that is in user space 504 but is not part of DLP agent 508 in order to correlate file downloads to a specific browser tab, URL, and/or server. By monitoring different parts of the operating system of endpoint device 502, the systems described herein may be able to monitor, assess, and act on various types of data transfers from different sources including data transfers through a browser application, data transfers through a file transfer application, and/or other types of data transfers.

As explained in connection with method 300 above, the systems and methods described herein may use a variety of techniques to determine whether an endpoint device is connected to a protected network or an external network and to select an appropriate DLP policy that provides the greatest amount of protected for sensitive data on and off the endpoint device without redundantly performing duplicate actions to a network-level DLP system. In some examples, the systems and methods described herein may use various techniques to identify the source of an inbound data transfer to an endpoint device that is not currently connected to a protected network, determine whether the inbound data transfer includes sensitive information, and take appropriate DLP actions. By monitoring and acting on inbound data transfers in this way, the systems and methods described herein may prevent users from intentionally or accidentally transferring sensitive data into an insecure situation where the sensitive data is at risk of being leaked. By only monitoring certain actions when the endpoint device is not connected to a protected network, the systems and methods described herein may avoid creating duplicate reports and adversely impacting user reputation when a user performs a risky action on a network that is already monitored by a network-level DLP policy that will create a report of the risky action.

Figure 6:
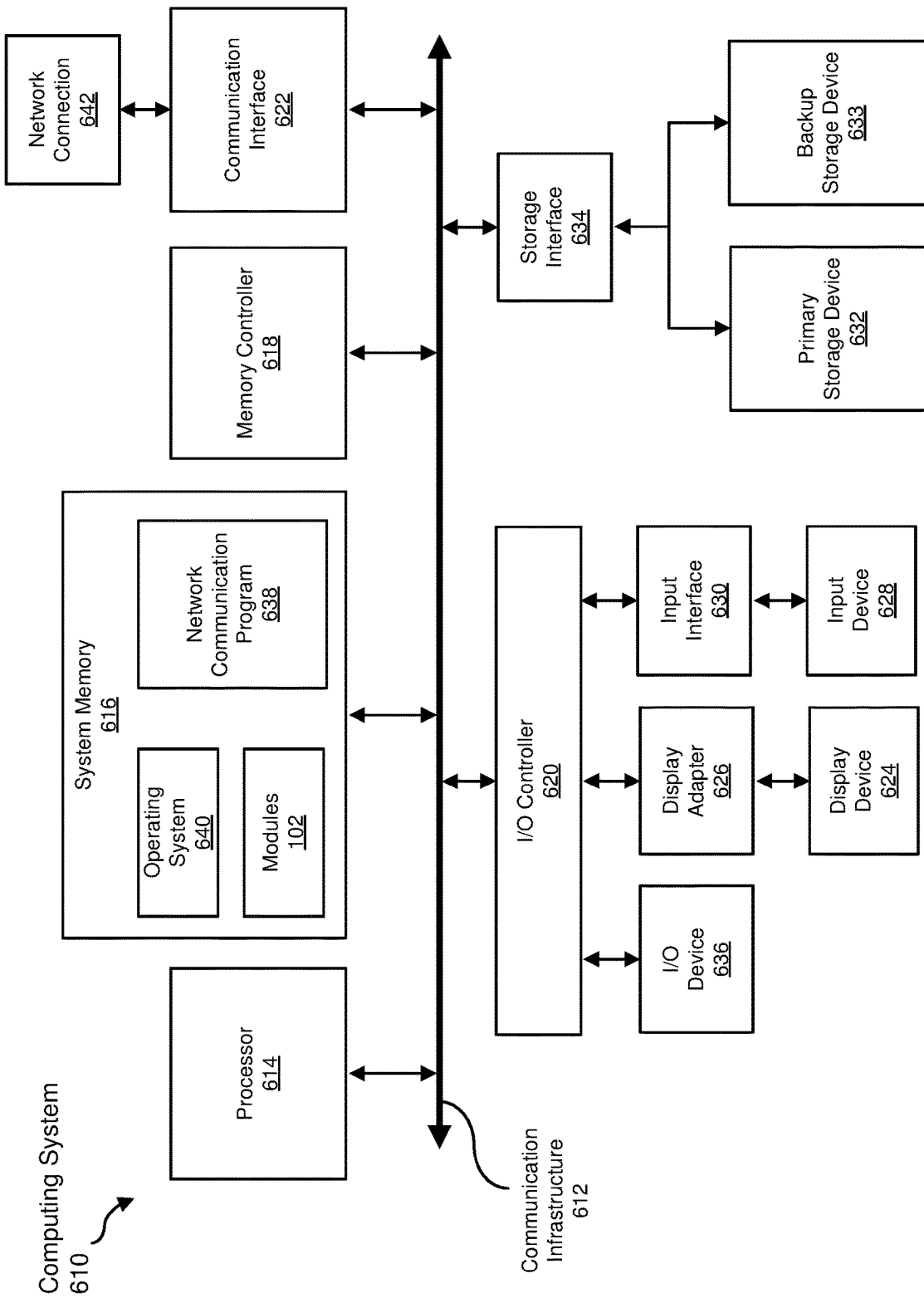
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636.

In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
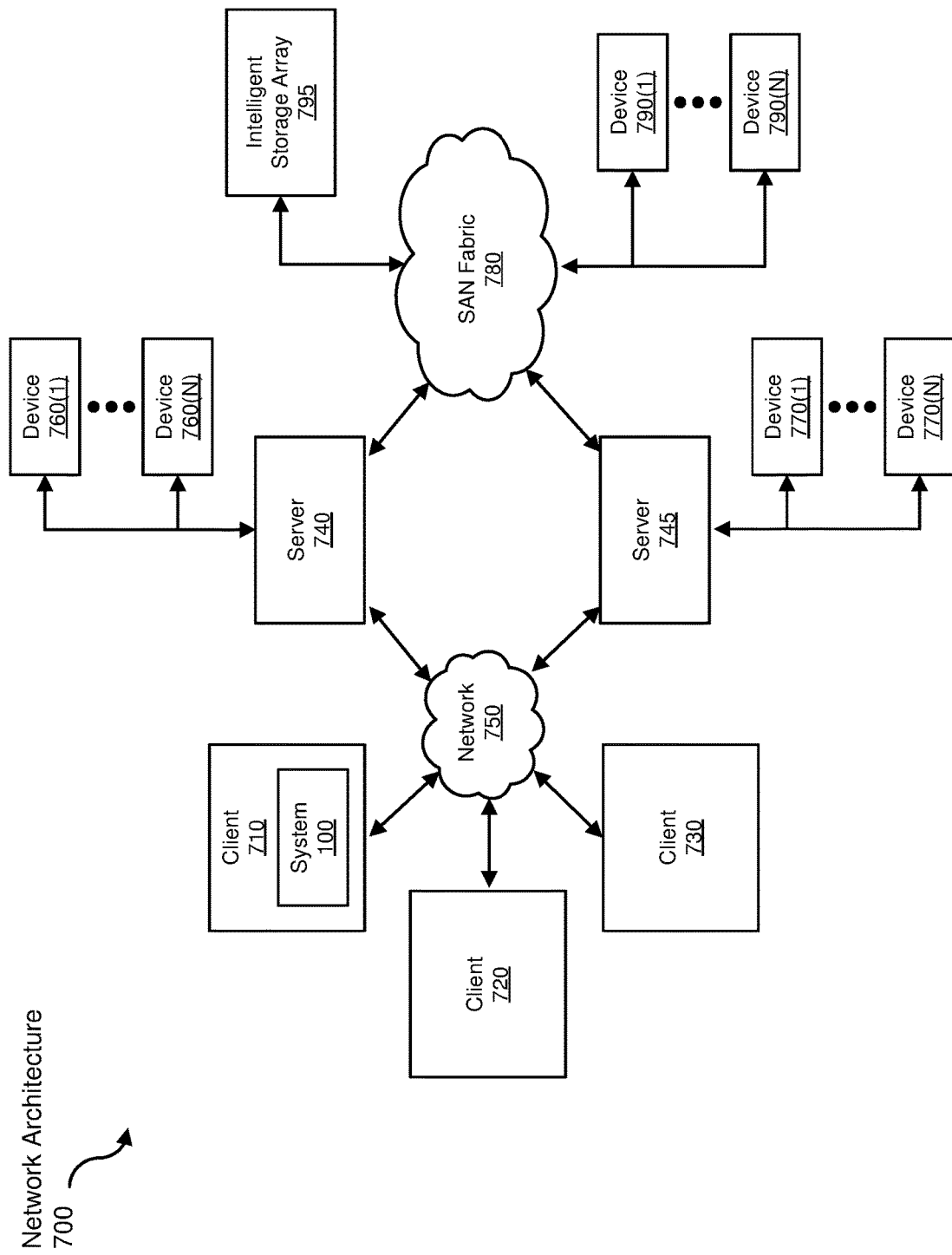
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enforcing data loss prevention policies on endpoint devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive sensitive data to be transformed, transform the sensitive data by encrypting the data, output a result of the transformation to an endpoint device, use the result of the transformation to safely store the sensitive data, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing data loss prevention policies on endpoint devices, at least a portion of the method being performed by a computing device comprising at least one processor, the method comprising:

detecting, at an endpoint device that comprises an endpoint data-loss prevention agent, that the endpoint device:

has terminated a connection with a protected network that is protected by a network-level data loss prevention system that protects sensitive data on the protected network; and has connected to an external network that is not protected by the network-level data loss prevention system;

switching, by the endpoint data-loss prevention agent and in response to detecting that the endpoint device has connected to the external network, from an in-network data loss prevention policy that applied to the connection between the endpoint device and the protected network to an out-of-network data loss prevention policy that applies to the connection between the endpoint device and the external network, wherein the out-of-network data loss prevention policy protects the sensitive data by monitoring both inbound and outbound data transfers on the endpoint device;

detecting, by the endpoint data-loss prevention agent, an inbound data transfer to the endpoint device via the external network;

determining, by the endpoint data-loss prevention agent, that the inbound data transfer to the endpoint device comprises a transfer from a protected source that is protected by the out-of-network data loss prevention policy; and performing, by the endpoint data-loss prevention agent, a security action in response to determining that the inbound data transfer to the endpoint device comprises the transfer from the protected source.

2. The computer-implemented method of claim 1, wherein the security action comprises blocking the inbound data transfer.

3. The computer-implemented method of claim 1, wherein the security action comprises encrypting data transferred by the inbound data transfer.

4. The computer-implemented method of claim 1, wherein the security action comprises creating an audit record documenting the inbound data transfer.

5. The computer-implemented method of claim 1, further comprising:

detecting an outbound data transfer from the endpoint device;

determining that the outbound data transfer from the endpoint device comprises a transfer of protected data that is protected by the out-of-network data loss prevention policy; and performing a security action in response to determining that the outbound data transfer from the endpoint device comprises the transfer of the protected data.

6. The computer-implemented method of claim 1, further comprising:

detecting that the endpoint device has terminated a connection with the external network that is not protected by the network-level data loss prevention system and has initiated a connection with the protected network that is protected by the network-level data loss prevention system; and switching, in response to detecting that the endpoint device has connected to the protected network, from the out-of-network data loss prevention policy the in-network data loss prevention policy, wherein the out-of-network data loss prevention policy comprises at least one policy rule not present in the in-network data loss prevention policy.

7. The computer-implemented method of claim 6, wherein switching to the in-network data loss prevention policy comprises ceasing monitoring, by a data loss prevention system on the endpoint device, inbound data transfers to the endpoint device.

8. The computer-implemented method of claim 1, wherein detecting the inbound data transfer to the endpoint device comprises monitoring a file system process via a plugin that extends the functionality of the file system process by providing information about data received by the file system process.

9. The computer-implemented method of claim 1, wherein:
 detecting the inbound data transfer to the endpoint device comprises identifying the inbound data transfer by a file system driver; and
 determining that the inbound data transfer to the endpoint device comprises the transfer from the protected source comprises identifying, by a network driver, an address of the protected source.

10. The computer-implemented method of claim 1, wherein:
 detecting the inbound data transfer to the endpoint device comprises detecting the inbound data transfer via an application programming interface hook to a web browser; and
 determining that the inbound data transfer to the endpoint device comprises the transfer from the protected source comprises identifying, by a browser extension, at least one of a uniform resource locator and a server of the protected source.

11. The computer-implemented method of claim 1, wherein detecting that the endpoint device has terminated the connection with the protected network and has connected to the external network comprises detecting that the endpoint device has terminated a virtual private network connection.

12. The computer-implemented method of claim 1, wherein detecting that the endpoint device has terminated the connection with the protected network and has connected to the external network comprises detecting that the endpoint device is no longer connected to a predetermined server.

13. The computer-implemented method of claim 1, wherein determining that the inbound data transfer to the endpoint device comprises the transfer from the protected source that is protected by the out-of-network data loss prevention policy comprises determining that the protected source is within the protected network.

14. A system for enforcing data loss prevention policies on endpoint devices, the system comprising:
 a network detection module, stored in memory, that detects, at an endpoint device that comprises an endpoint data-loss prevention agent, that the endpoint device:
  has terminated a connection with a protected network that is protected by a network-level data loss prevention system that protects sensitive data on the protected network; and
  has connected to an external network that is not protected by the network-level data loss prevention system;
 a switching module, stored in memory, that switches, by the endpoint data-loss prevention agent and in response to detecting that the endpoint device has connected to the external network, from an in-network data loss prevention policy that applied to the connection between the endpoint device and the protected network to an out-of-network data loss prevention policy that applies to the connection between the endpoint device and the external network, wherein the out-of-network data loss prevention policy protects the sensitive data by monitoring both inbound and outbound data transfers on the endpoint device;
 a transfer detection module, stored in memory, that detects, by the endpoint data-loss prevention agent, an inbound data transfer to the endpoint device via the external network;
 a determination module, stored in memory, that determines, by the endpoint data-loss prevention agent, that the inbound data transfer to the endpoint device comprises a transfer from a protected source that is protected by the out-of-network data loss prevention policy;
 a security module, stored in memory, that performs, by the endpoint data-loss prevention agent, a security action in response to determining that the inbound data transfer to the endpoint device comprises the transfer from the protected source; and
 at least one physical processor that executes the network detection module, the switching module, the transfer detection module, the determination module, and the security module.

15. The system of claim 14, wherein the security action comprises blocking the inbound data transfer.

16. The system of claim 14, wherein the security action comprises encrypting data transferred by the inbound data transfer.

17. The system of claim 14, wherein the security action comprises creating an audit record documenting the inbound data transfer.

18. The system of claim 14, further wherein:
 the transfer detection module detects an outbound data transfer from the endpoint device;
 the determination module determines that the outbound data transfer from the endpoint device comprises a transfer of protected data that is protected by the out-of-network data loss prevention policy; and
 the security module performs a security action in response to determining that the outbound data transfer from the endpoint device comprises the transfer of the protected data.

19. The system of claim 14, wherein:
 the network detection module detects that the endpoint device has terminated a connection with the external network that is not protected by the network-level data loss prevention system and has initiated a connection with the protected network that is protected by the network-level data loss prevention system; and
 the switching module switches, in response to detecting that the endpoint device has connected to the protected network, from the out-of-network data loss prevention policy the in-network data loss prevention policy, wherein the out-of-network data loss prevention policy comprises at least one policy rule not present in the in-network data loss prevention policy.

20. A non-transitory computer-readable medium comprising one or more computer-readable instructions that, when executed by at least one processor of a computing device, cause the computing device to:
 detect, at an endpoint device that comprises an endpoint data-loss prevention agent, that the endpoint device:

has terminated a connection with a protected network that is protected by a network-level data loss prevention system that protects sensitive data on the protected network; and has connected to an external network that is not protected by the network-level data loss prevention system;

switch, by the endpoint data-loss prevention agent and in response to detecting that the endpoint device has connected to the external network, from an in-network data loss prevention policy that applied to the connection between the endpoint device and the protected network to an out-of-network data loss prevention policy that applies to the connection between the endpoint device and the external network, wherein the out-of-network data loss prevention policy protects the sensitive data by monitoring both inbound and outbound data transfers on the endpoint device;

detect, by the endpoint data-loss prevention agent, an inbound data transfer to the endpoint device via the external network;

determine, by the endpoint data-loss prevention agent, that the inbound data transfer to the endpoint device comprises a transfer from a protected source that is protected by the out-of-network data loss prevention policy; and perform, by the endpoint data-loss prevention agent, a security action in response to determining that the inbound data transfer to the endpoint device comprises the transfer from the protected source.

* * * * *